United States Patent [19]

Smith

[11] Patent Number: 5,536,161
[45] Date of Patent: Jul. 16, 1996

[54] DOUBLE LOCK PAIL MOLD

[75] Inventor: Arthur H. Smith, East Brunswick, N.J.

[73] Assignee: North America Packaging Corporation, Atlanta, Ga.

[21] Appl. No.: 532,862

[22] Filed: Sep. 22, 1995

Related U.S. Application Data

[63] Continuation of Ser. No. 148,282, Nov. 5, 1993, abandoned.

[51] Int. Cl.⁶ .............................. B29C 33/44; B29C 45/44
[52] U.S. Cl. ........................ 425/438; 249/58; 264/318; 264/334; 425/443; 425/556; 425/DIG. 58
[58] Field of Search ................................ 249/58, 63, 161; 264/318, 334; 425/438, 441, 443, 422, 577, 556, DIG. 58

[56] References Cited

U.S. PATENT DOCUMENTS

| | | | |
|---|---|---|---|
| 3,469,284 | 9/1969 | Ross | 425/441 |
| 3,572,424 | 3/1971 | Byrne | 425/441 |
| 3,811,645 | 5/1974 | Feist | 425/441 |
| 3,905,740 | 9/1975 | Lovejoy | 425/438 |
| 3,930,780 | 1/1976 | Lovejoy | 425/441 |
| 3,952,991 | 4/1976 | Schneider | 264/335 |
| 3,977,821 | 8/1976 | Lovejoy | 425/441 |
| 3,978,186 | 8/1976 | Lovejoy | 264/334 |
| 3,999,677 | 12/1976 | Oberkircher | 220/266 |
| 4,005,101 | 1/1977 | Ruch | 264/334 |
| 4,025,022 | 5/1977 | Theysohn et al. | 425/438 |
| 4,044,092 | 8/1977 | Spears | 264/318 |
| 4,077,759 | 3/1978 | Saumsiegle et al. | 425/556 |
| 4,125,246 | 11/1978 | Von Holdt | 425/438 |
| 4,125,247 | 11/1978 | Gabrys | 425/438 |
| 4,201,360 | 5/1980 | Schwartzburg et al. | 264/318 |
| 4,209,160 | 6/1980 | Vanotti | 425/441 |
| 4,210,620 | 7/1980 | Von Holdt | 264/318 |
| 4,286,766 | 9/1981 | Von Holdt | 249/84 |
| 4,339,408 | 7/1982 | Jenkins | 264/334 |
| 4,362,291 | 12/1982 | Fuke et al. | 425/441 |
| 4,383,819 | 5/1983 | Letica | 425/577 |
| 4,476,083 | 10/1984 | vonHoldt | 264/318 |
| 4,502,660 | 3/1985 | Luther et al. | 425/441 |
| 4,524,943 | 6/1985 | Busch et al. | 264/334 |
| 4,533,312 | 8/1985 | Von Holdt | 425/438 |
| 4,541,795 | 9/1985 | Cole | 425/438 |
| 4,570,897 | 2/1986 | Von Holdt | 425/438 |
| 4,588,158 | 5/1986 | Mehra | 425/577 |
| 4,622,002 | 11/1986 | Bormüth | 425/577 |
| 4,627,810 | 12/1986 | Von Holdt | 425/577 |
| 4,632,357 | 12/1986 | Von Holdt | 249/58 |
| 4,648,834 | 3/1987 | Von Holdt | 425/422 |
| 4,676,731 | 6/1987 | Grannen, III | 425/441 |
| 4,676,732 | 6/1987 | Letica | 425/577 |
| 4,717,113 | 1/1988 | Martin | 425/438 |
| 4,731,014 | 3/1988 | VonHoldt | 425/441 |
| 4,732,558 | 3/1988 | Grannen, III | 425/441 |
| 4,765,585 | 8/1988 | Wieder | 425/556 |
| 4,768,747 | 9/1988 | Williams et al. | 425/577 |
| 4,777,004 | 10/1988 | Galer | 425/438 |
| 4,822,553 | 4/1989 | Marshall | 425/438 |
| 4,832,307 | 5/1989 | Watanabe et al. | 425/556 |
| 4,889,480 | 12/1989 | Nakamura et al. | 425/577 |
| 4,923,388 | 5/1990 | Nakamura | 425/589 |
| 4,998,874 | 3/1991 | Stocchiero | 425/438 |
| 5,053,182 | 10/1991 | Hedgewick | 264/318 |
| 5,074,771 | 12/1991 | Thakrar et al. | 425/556 |
| 5,114,655 | 5/1992 | Cole | 425/438 |
| 5,167,898 | 12/1992 | Luther | 425/577 |

FOREIGN PATENT DOCUMENTS

| | | | |
|---|---|---|---|
| 225948 | 8/1985 | Germany | 425/577 |
| 56-34418 | 4/1981 | Japan | 264/334 |

*Primary Examiner*—Robert Davis
*Attorney, Agent, or Firm*—Miller & Christenbury

[57] ABSTRACT

A mold for forming an article having one or more substantial radial protrusions. The mold includes a core movable along a molding axis, a stripper ring movable a limited distance along one set of guide rods with axes parallel to the molding axis, a split ring having segments movable adjacent to the stripper ring for the limited distance and movable relative to the stripper ring on a second set of guide rods at an angle to the molding axis, and a cavity. The article is removable from the mold when the core is moved away from the cavity, the stripper ring is moved its limited distance, and the split ring segments are moved with the stripper ring and then relative to the stripper ring at an angle to the molding axis.

8 Claims, 13 Drawing Sheets

DOUBLE LOCK PAIL MOLD

This application is a continuation of application Ser. No. 08/148,282, filed Nov. 5, 1993, now abandoned

BACKGROUND OF THE INVENTION

This invention relates to a mold assembly and method for injection molding and releasing pails having radial protrusions extending outwardly from their walls.

FIELD OF THE INVENTION

There has been a significant increase in demand for plastic pails with integral locking mechanisms which permit secure or even permanent attachment of a cover to limit access to the pail. Such a locking mechanism requires the formation of at least one protrusion from the pail wall near the pail opening so that mating contours on the cover can engage the pail. In addition to these locking mechanism protrusions, pails are frequently provided with a skirt to increase hoop strength, provide spacing between filled pails stored next to each other, to provide a stop to limit the degree of nesting, and provide a surface for the attachment of bail handles.

Reference is hereby made to my co-pending U.S. application Ser. No. 08/101,987, filed Aug. 4, 1993, which is directed to novel features of the pail.

Pail wall protrusions for locking mechanisms and skirts have presented a challenge to container manufacturers. Injection mold assemblies adapted to form such protrusions must be capable of producing detailed contours while permitting rapid and complete release of molded pails.

Integrally molded locking mechanisms capable of securely or permanently engaging covers have radial protrusions too large to permit mold component separation along a single, common axis; thereby requiring the use of side action wherein one or more mold components move radially outwardly to release the molded pail. The use of side action traditionally required increased mold manufacturing and maintenance costs due to an increase in the number of mold components and wear caused by relative motion between adjacent mold components.

Conventional side-action molds have significant disadvantages. The mold disclosed in U.S. Pat. No. 4,570,897 has a complicated and expensive assembly for forming a recess under a skirt-shaped protrusion. If such a complicated and expensive assembly could, in fact, be produced and operated, it would surely experience a high failure rate and shortened life due to excessive relative movement between adjacent mold components.

The mold assemblies disclosed in U.S. Pat. Nos. 4,632,357 and 5,167,898 also require excessive sliding contact between adjacent movable components, thereby causing excessive wear and mold failure.

U.S. Pat. No. 4,648,834 discloses a mold assembly that operates without side action. Such a mold assembly cannot be used to create the substantial and detailed protrusions necessary to provide a pail locking mechanism to which a cover can be securely or permanently attached.

Accordingly, there is a great and thus far unsatisfied demand for a mold assembly and molding method capable of producing an article having substantial radial protrusions without dramatically increasing mold costs, maintenance and wear.

OBJECTS OF THE INVENTION

It is an object of this invention to provide a mold assembly and method for forming an article having substantial radial protrusions which cannot be formed in mold assemblies without side action.

It is another object of the invention to provide a mold assembly and method for forming a pail with a locking mechanism adapted to securely or permanently engage a cover component to limit access to the pail.

It is a further object of the invention to provide a side-action mold assembly and method having reduced mold production costs, wear, maintenance and operational failures.

It is yet another object of this invention to provide a mold assembly and method for molding radially protruding details while facilitating rapid release of the molded product.

SUMMARY OF THE INVENTION

This invention provides an injection mold assembly and method for forming a pail having multiple radial protrusions in the form of a skirt and double locking mechanism extending outwardly from the pail's wall. The combination and size of the protrusions require the use of mold side action to release the molded product.

The mold assembly has a core, cavity, solid stripper ring and a split ring having two or more segments. The core and cavity separate along a common axis and cooperate to form the bottom and lower side wall portions of the pail as well as a recess under the skirt extending from the pail's wall. The solid stripper ring forms several details of the pail's locking mechanism and strips the molded pail from the core. The segments of the stripper ring form the remaining details of the locking mechanism and a portion of the pail's skirt.

The solid stripper ring travels a limited distance along guide rods having axes parallel to that of the core and cavity, and the solid stripper ring advances as it follows the split ring segments. The split ring segments are advanced by ejector rods which force the segments away from the core. Upon termination of the solid stripper ring's travel, each split ring segment travels along guide rods having axes at an angle to the core and cavity axis. The segments are advanced a distance sufficient to release the molded pail and provide clearance for the pail's removal. This action is then reversed to reassemble the mold components in a closed configuration to permit the molding of subsequent pails.

DETAILED DESCRIPTION OF THE INVENTION

Figure 1:
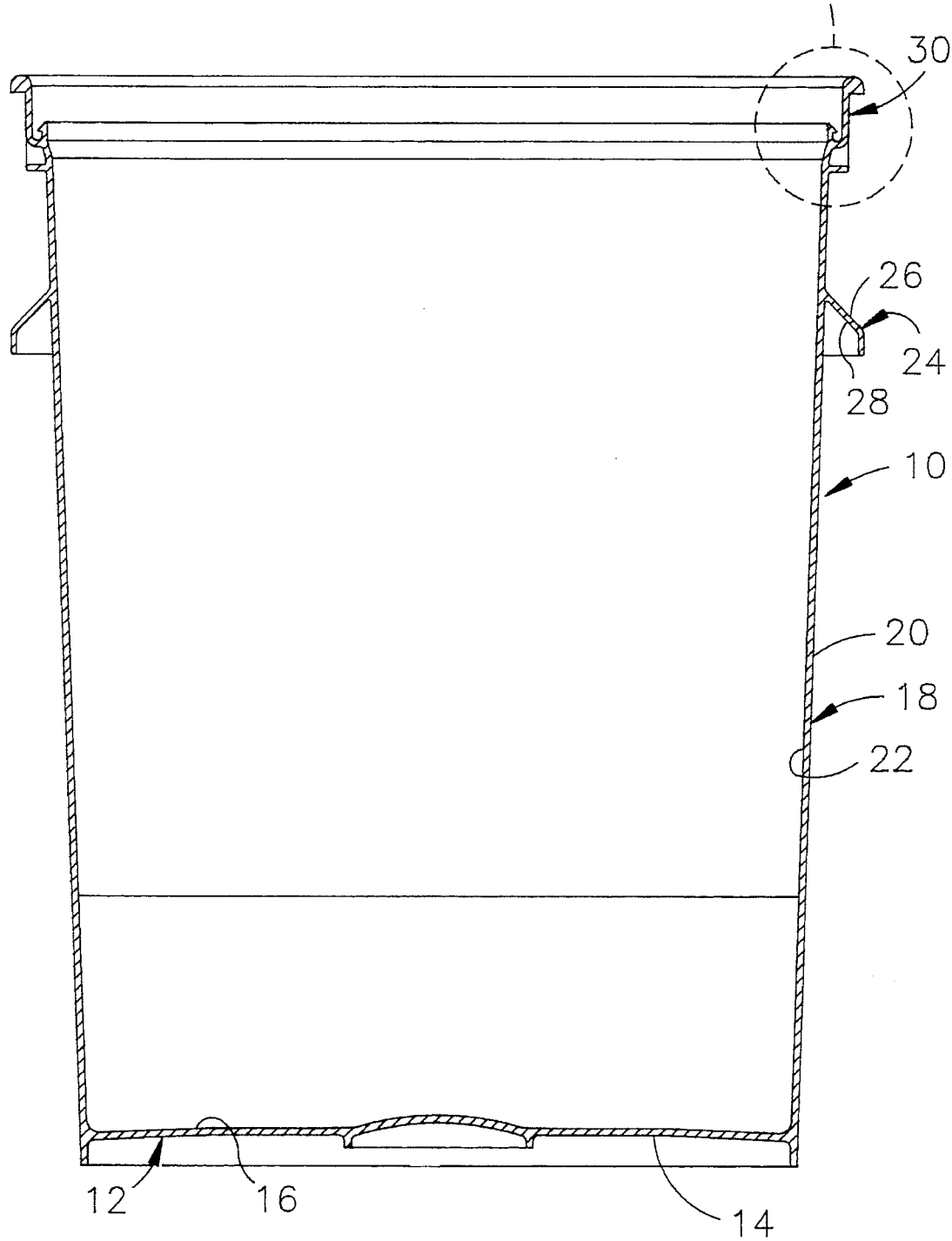
FIG. 1 is a cross-sectional side view of one form of pail embodying features of this invention.

The following description is intended to refer to the specific embodiments of the invention illustrated in the drawings. This description is not intended to define or limit the scope of the invention, which is defined separately in the claims that follow.

Referring to FIG. 1, the pail 10 produced by an embodiment of this mold assembly invention has a bottom 12 with outer surface 14 and inner surface 16. The pail also has a wall 18 with outer surface 20 and inner surface 22. On the outer surface of the pail's wall is a skirt 24 with an outer downwardly inclined surface 26 and a recessed surface 28. Above skirt 24 is a double locking mechanism 30 which allows secure or even permanent locking engagement with a mating cover (not shown).

Figure 2:
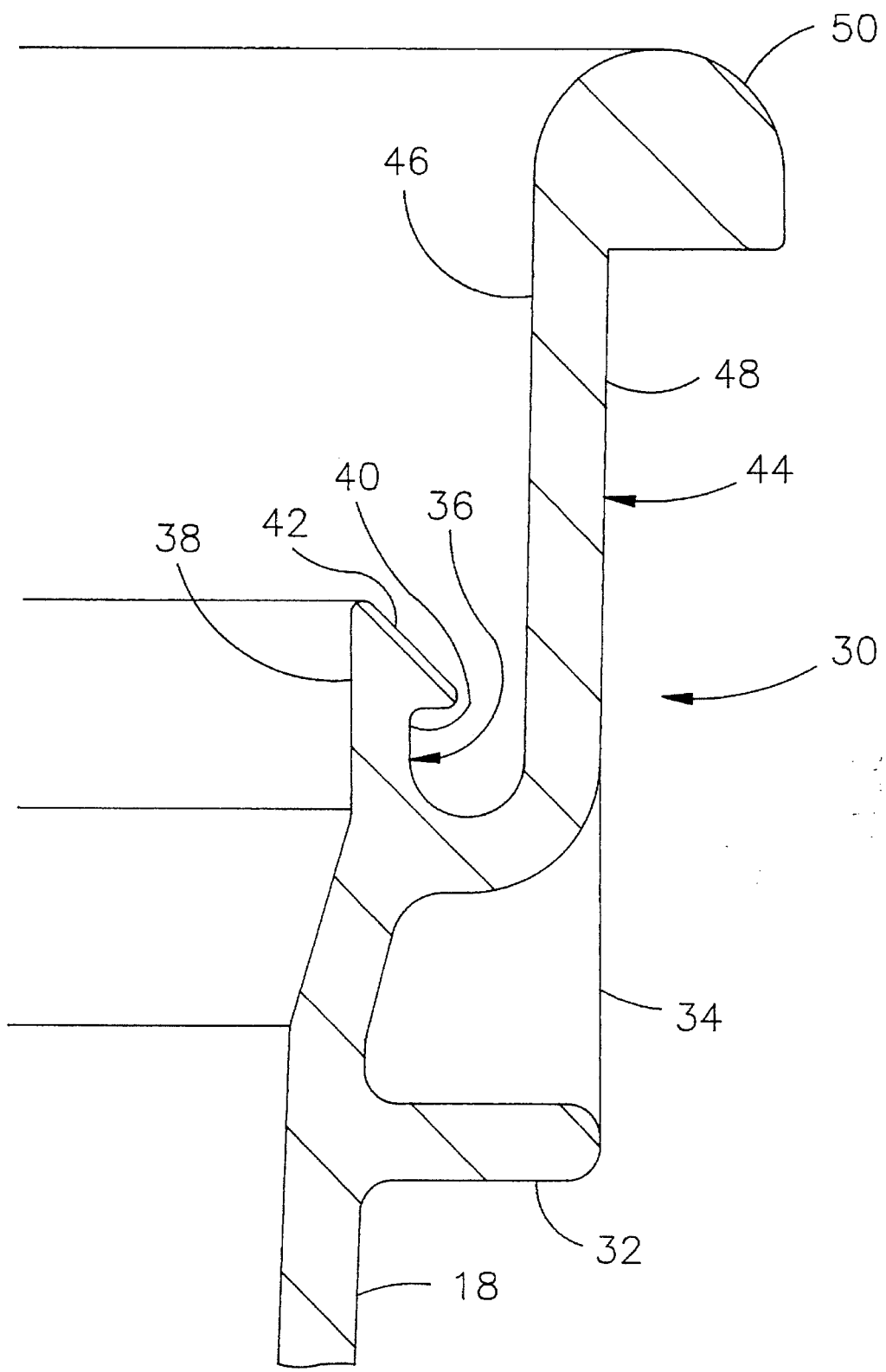
FIG. 2 is a cross-sectional side view of a detail of a locking mechanism on the pail shown in FIG. 1.

FIG. 2 is a detailed representation of double locking mechanism 30 formed in pail wall 18. Locking mechanism 30 has inner lock member 36, outer lock member 44, and stiffening flange 32. Inner lock member 36 has inner surface 38, outer surface 40 and terminates in outwardly extending inclined flange 42. Similarly, outer lock member 44 has inner surface 46, outer surface 48 and terminates in outwardly extending flange 50. Stiffening flange 32 is formed integrally with outer lock member 44 via a plurality of ribs 34, thereby providing additional support to outer lock member 44 as well as additional hoop strength to the pail.

Figure 3:
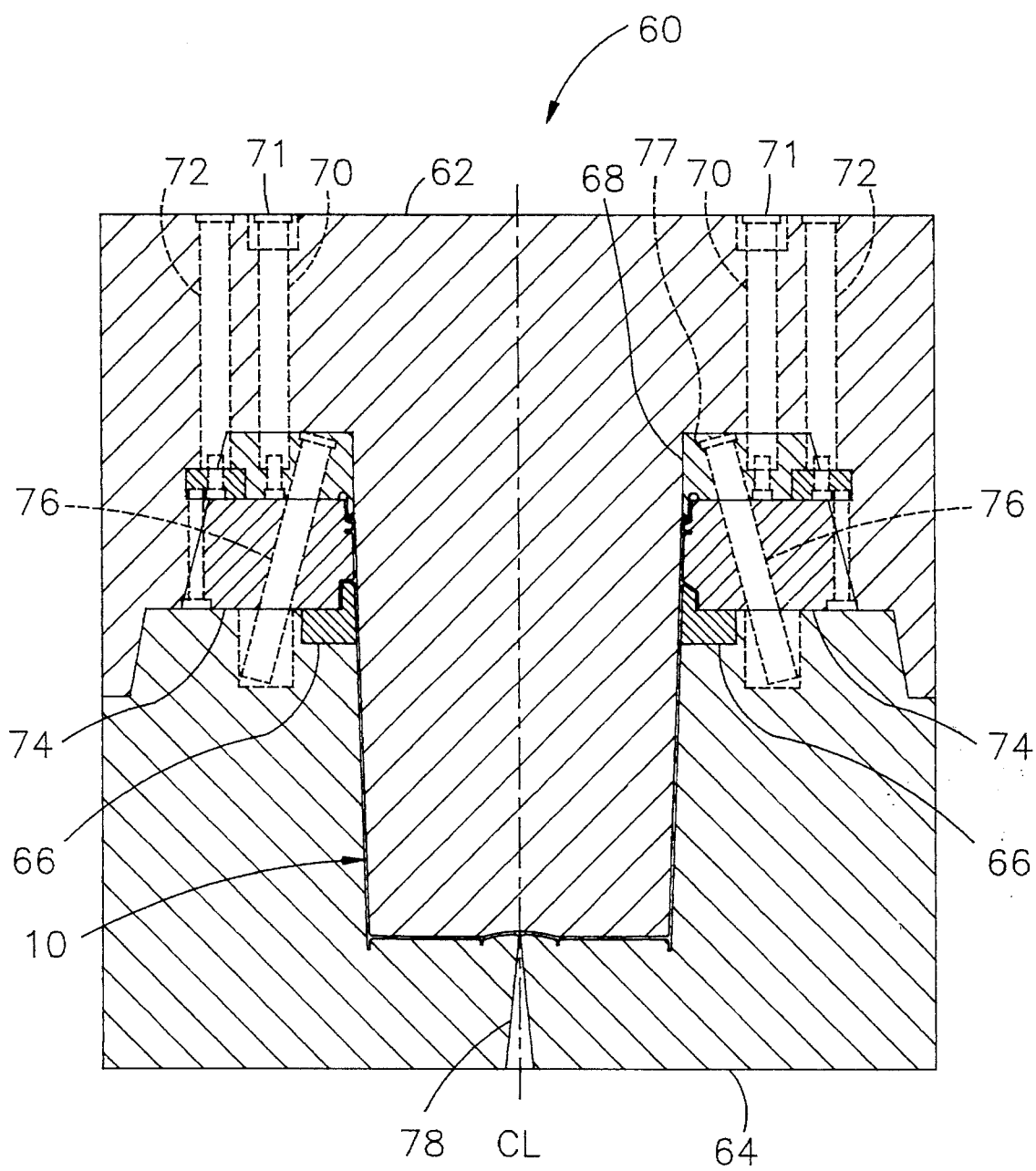
FIG. 3 is a cross-sectional side view of a mold assembly according to this invention in its closed configuration.

FIG. 3 illustrates an embodiment of a mold assembly according to this invention, generally designated 60, in its closed configuration. Mold assembly 60 has a core 62 movable along its centerline CL, hereinafter referred to as the core axis. Core 62 is shaped to form inner surface 38 of inner lock member 36 (FIG. 2), inner surface 22 of pail wall 18, and inner surface 16 of pail bottom 12. A mold cavity 64 is fixedly mounted along the core axis and is provided with insert 66. Cavity 64 is shaped to form outer surface 20 (FIG. 1) of pail wall 18 and outer surface 14 of pail bottom 12. Insert 66 is shaped to form recessed surface 28 of skirt 24. Insert 66 is preferably shaped to form portions of skirt 24 adapted for attachment of the usual bail handle (not shown).

A solid stripper ring 68 is mounted to guide rods 70 with axes parallel to the core axis CL. Guide rods 70 have stops 71 adjacent their upper ends to limit travel of ring 68 as it moves away from core 62, as will be described in further detail hereinafter. Ring 68 is shaped to form outer surface 40 (FIG. 2) and flange 42 of inner lock member 36 of the pail as well as inner surface 46 and flange 50 of outer lock member 44 of the pail. Ring 68 is provided with rigidly mounted guide rods 76 which are directed at an angle from the core axis and away from centerline CL of core 62. Guide rods 76 have shoulders 77 and are mounted in stationary positions by means of a press-fit between the shaft of rods 76 and ring 68. Ring 68, along with guide rods 76, travels along guide rods 70 in a direction parallel to the core axis.

Split ring segments 74 are positioned adjacent ring 68 (as in FIG. 3) when mold assembly 60 is in its closed configuration. Segments 74 are adapted to form outer surface 48 of outer lock member 44, stiffening flange 32, ribs 34 and outer surface 26 of skirt 24 (FIG. 2). In operation segments 74 are pushed away from core 62 by ejector rods 72 of which there are preferably two for each segment 74. Segments 74 are shaped to accommodate guide rods 76, each segment 74 preferably accommodating two guide rods 76.

Mold assembly 60 preferably has four segments 74 that are approximately equal in size and equally spaced. Opposing segments are preferably shaped to cooperate with insert 66 to form pail portions of skirt 24 adapted for attachment of a bail handle.

When the components of mold assembly 60 are in their closed configuration as shown in FIG. 3, fluid material such as polyethylene, for example, is injected between the core 62, the cavity 64, split ring segments 74 and solid ring 68, by means of sprue 78 formed in cavity 64 or a separate sprue insert. The fluid material, by this injection, fills the annular void created by cooperation of the aforesaid mold components 62, 64, 66, 68 and 74.

Figure 4A:
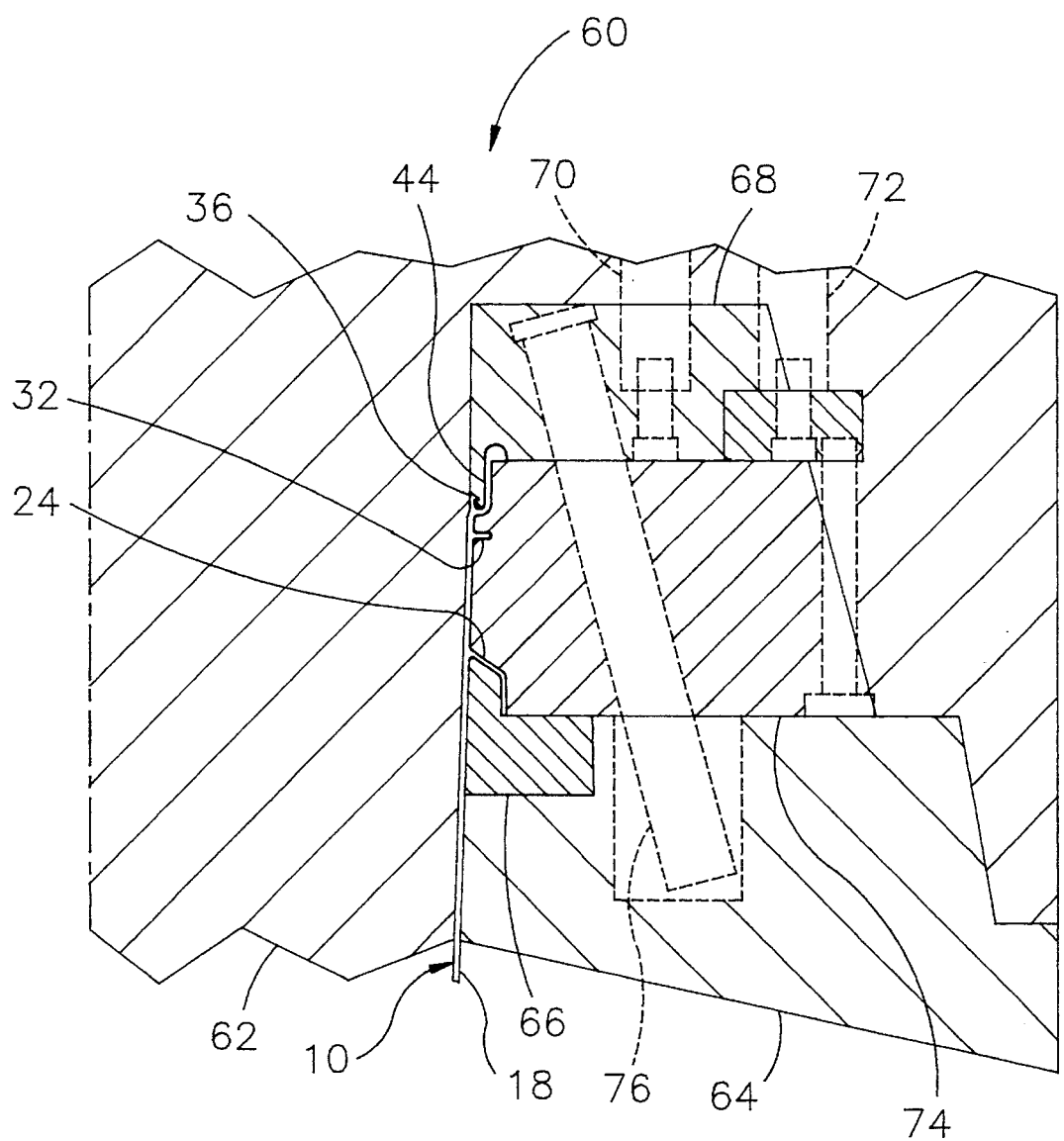
FIGS. 4a–4e are cut-a-way cross-sectional side views of the embodiment of the mold assembly shown in FIG. 3, illustrating a progression from the mold's closed configuration (FIG. 4a) to the mold's open configuration (FIG. 4e).

The operation of mold assembly 60 is now described with reference to FIGS. 4a–4e. FIG. 4a illustrates the mold components in their closed configuration after fluid material has been injected into the mold assembly.

Figure 4B:
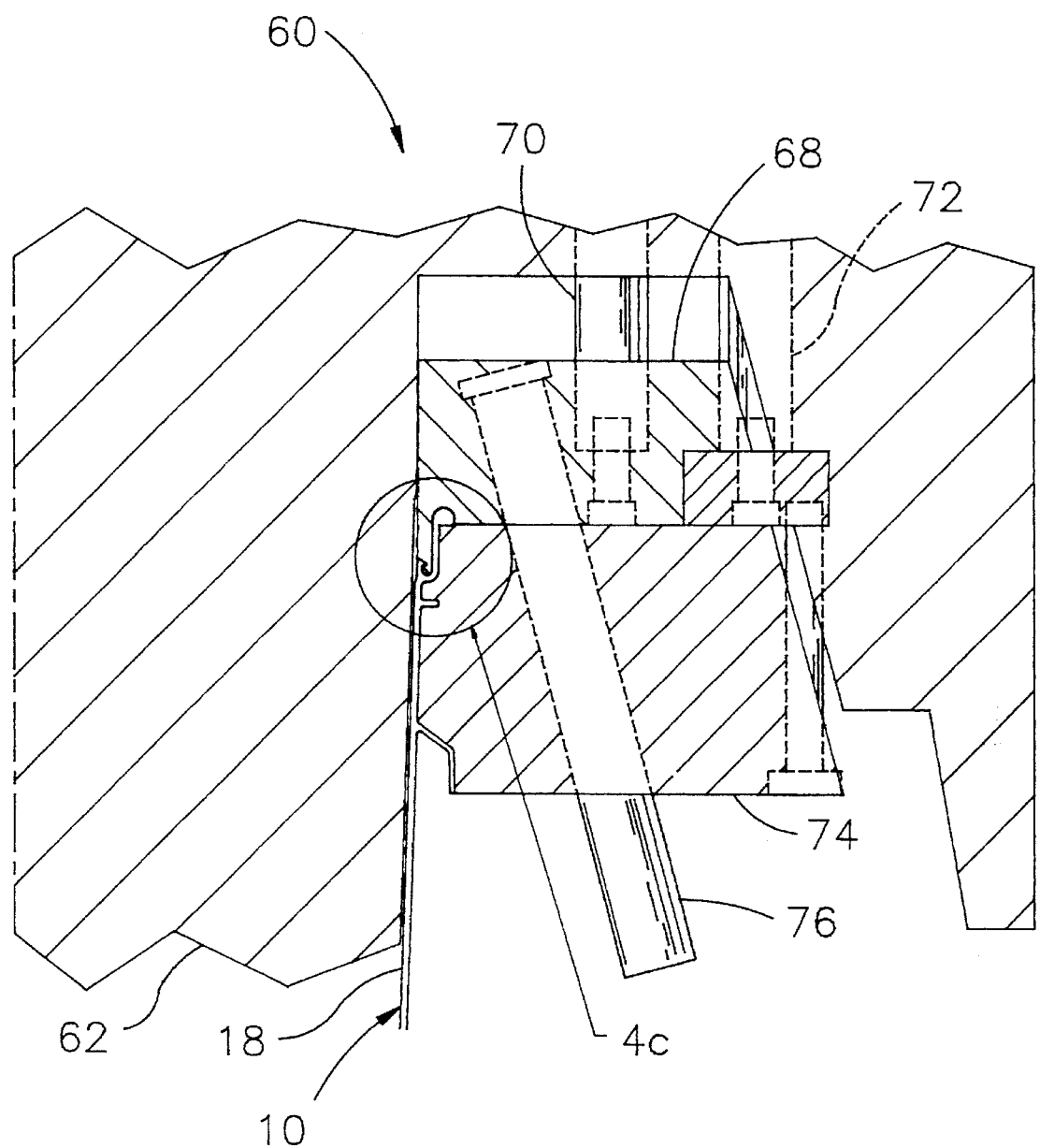

In FIG. 4b the core 62 is shown removed from engagement with cavity 64 and insert 66, thereby freeing the recess surface 28 of skirt 24 (FIG. 1) and the outer surfaces of the pail's wall and bottom from the mold cavity 64. Ejector rods 72 then, under the influence of driving means such as hydraulics (not shown), force ring segments 74 to travel in a direction parallel to the core axis. Ring 68 follows ring segments 74 along guide rods 70 in a direction parallel to the core axis, and ring 68 and segments 74 do not move relative to each other. The inside surfaces of pail 10 are readily separated from core 62 as ring 68 and ring segments 74 push pail 10 along the core axis.

Inner lock member 36 of pail 10 (FIG. 2) engages ring 68, causing ring 68 to follow ring segments 74. A pusher (not shown) optionally provides downward force sufficient to assist ring 68 in following segments 74. The pusher is preferably a pneumatically or hydraulically actuated piston (known per se) that moves downwardly when the area of a cylinder above the pusher is pressurized in the usual manner. Release or reversal of the pressure in the usual manner permits the pusher to travel upwardly as the mold returns to its closed configuration.

Figure 4C:
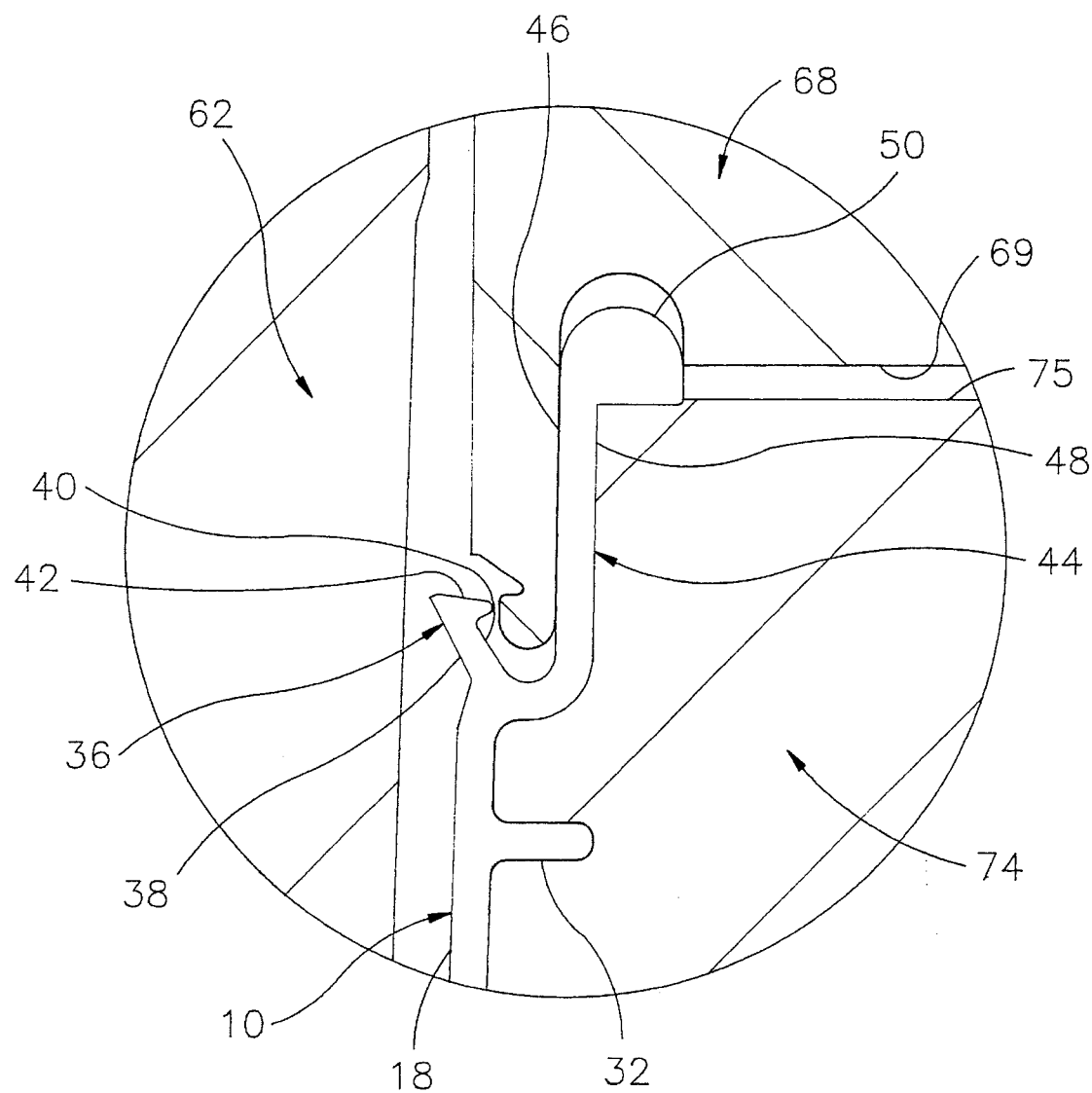

FIG. 4c illustrates the pail's locking mechanism as it appears immediately after ring 68 has reached the limit of its travel, as a surface 75 of split ring segments 74 (FIG. 3) separates from a surfaces 69 of ring 68, but before ring segments 74 travel any significant distance along guide rods 76. Because ring 68 and segments 74 have traveled along the core axis for the limited travel of ring 68 without moving relative to each other, and because ring segments 74 can only move outwardly along guide rods 76 after ring 68 stops, there is no sliding contact between mold components 68 and 74. Flange 50 on pail outer lock member 44 and flange 42 on pail inner lock member 36 both separate from solid ring 68 of the mold. Flange 42 of the pail deforms inwardly from the portion of ring 68 that forms the inner lock member's outer surface to permit the release of pail flange 42 from ring 68. The curved contour between pail flange 42 and outer surface 40 of pail inner lock member 36 permits this deformation without causing damage to inner lock member 36. Stiffening flange 32 and ribs 34 (not shown) remain in contact with ring segments 74.

Figure 4D:
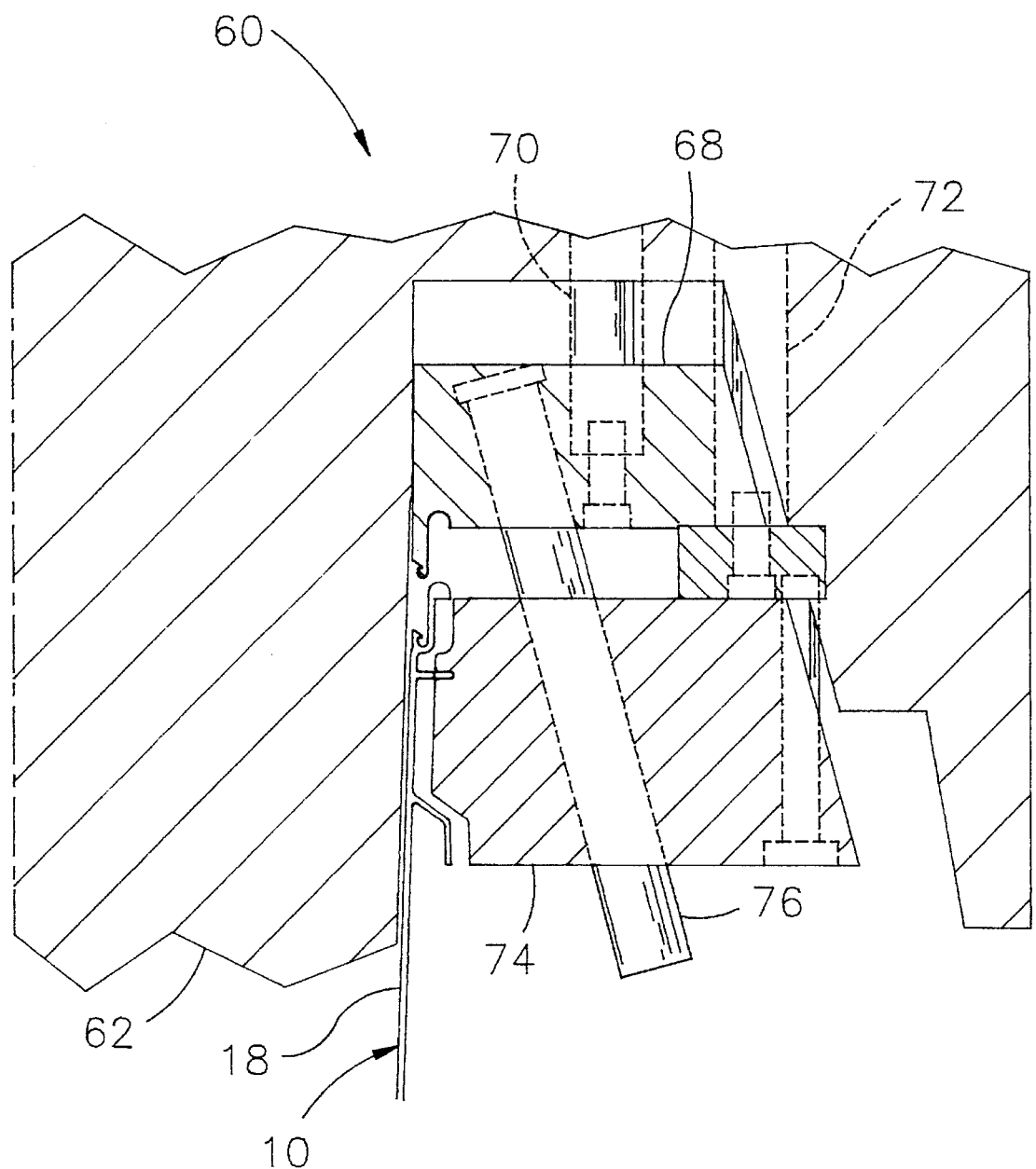

FIG. 4d shows mold assembly 60 as it appears after split ring segments 74 have traveled along guide rods 76 outwardly from core 62. Ejector rods 72, as will be apparent, continue to push ring segments 74 along angled guide rods 76 as solid stripper ring 68 remains stationary at the end of its travel. At this point in the molding process, pail outer lock member 44, stiffening flange 32, ribs 34 (not shown) and skirt 24 are substantially free from mold components 62, 68 and 74, although there is not yet enough clearance to remove the pail without interfering with ring segments 74.

Figure 4E:
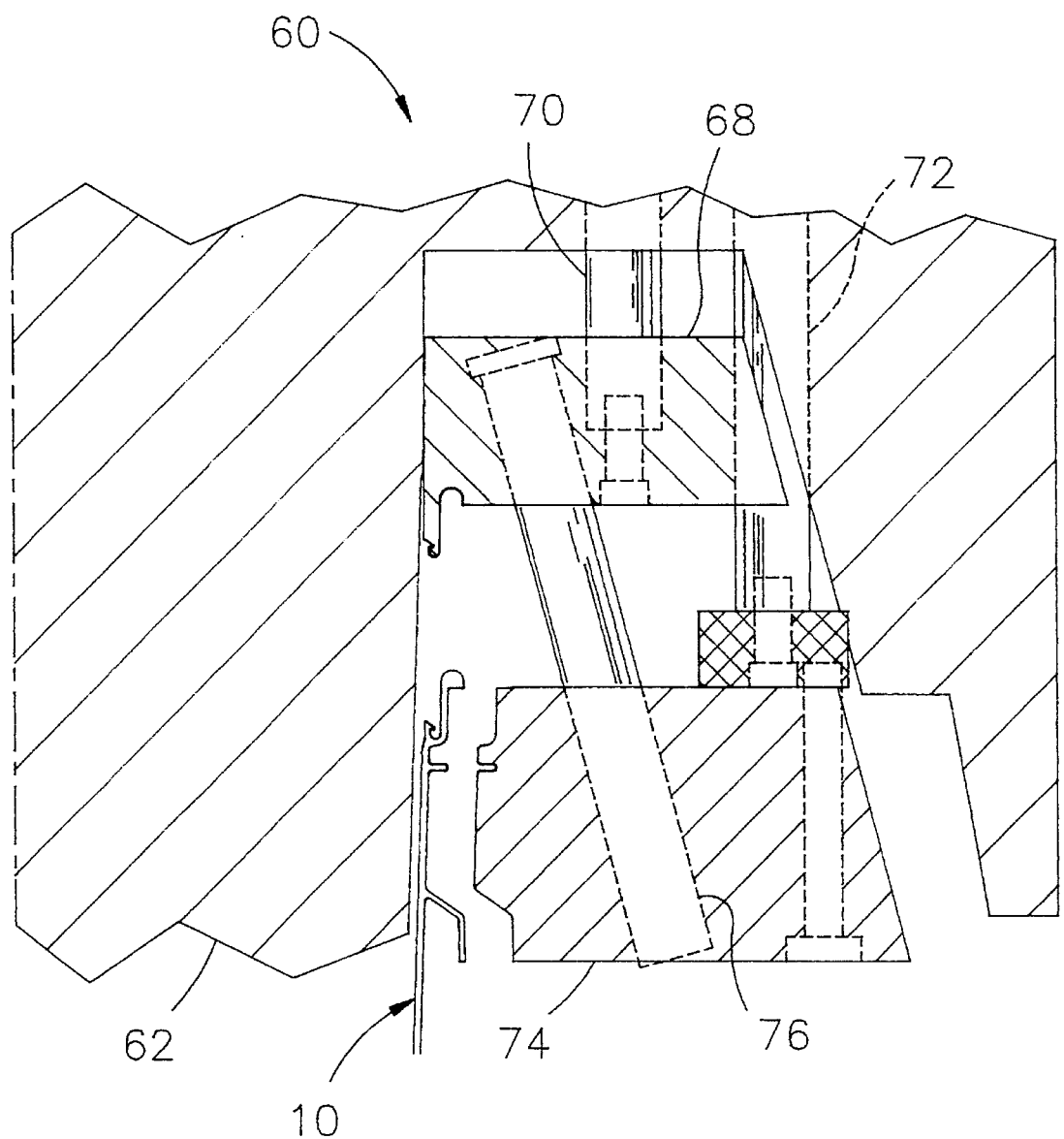

FIG. 4e shows mold assembly 60 in a fully opened configuration in which ejector rods 72 have fully extended to move ring segments 74 along guide rods 76 to the end of their travel while solid stripper ring 68 remained stationary at the end of its travel. Ring segment 74 is now separated from stripper ring 68 in a direction having a component along the core axis or centerline CL. At this point, the molded pail material has had time to at least partially solidify and the molded pail 10 can be easily removed from mold assembly 60. The distance ring segments 74 travel along guide rods 76, and the angle at which guide rods 76 are mounted within ring 68, must cooperate to permit removal of the pail from the mold. The angle of rods 76 to the centerline CL is preferably between about 5° and 90°, and more preferably between about 10° and 35°. The length of travel along the rods 76 may be in accordance with the angle selected and the size of the locking mechanism 30 to be molded.

The steps of injecting, forming and releasing pails are, of course, rapidly repeated, time after time, to produce a large number of pails by repeated molding operations. To prepare for the injection of fluid material to form the next pail in the cycle, the ejector rods 72 bring ring segments 74 back along guide rods 76 until they contact solid stripper ring 68. At that point ring segments 74 and ring 68 move along the axis of guide rods 70 in a direction parallel to the core axis until ring 68 fully contacts core 62. Core 62 then recontacts cavity 64, thereby returning mold assembly 60 to its closed configuration.

Mold assembly 60 shown in FIG. 3 has ring segment guide rods 76 rigidly mounted within solid stripper ring 68 so that guide rods 76 travel with ring 68 and remain stationary when ring 68 reaches the end of its travel. This feature minimizes relative sliding contact between ring 68 and ring segments 74 as well as the mold wear associated with such sliding contact.

Figure 5:
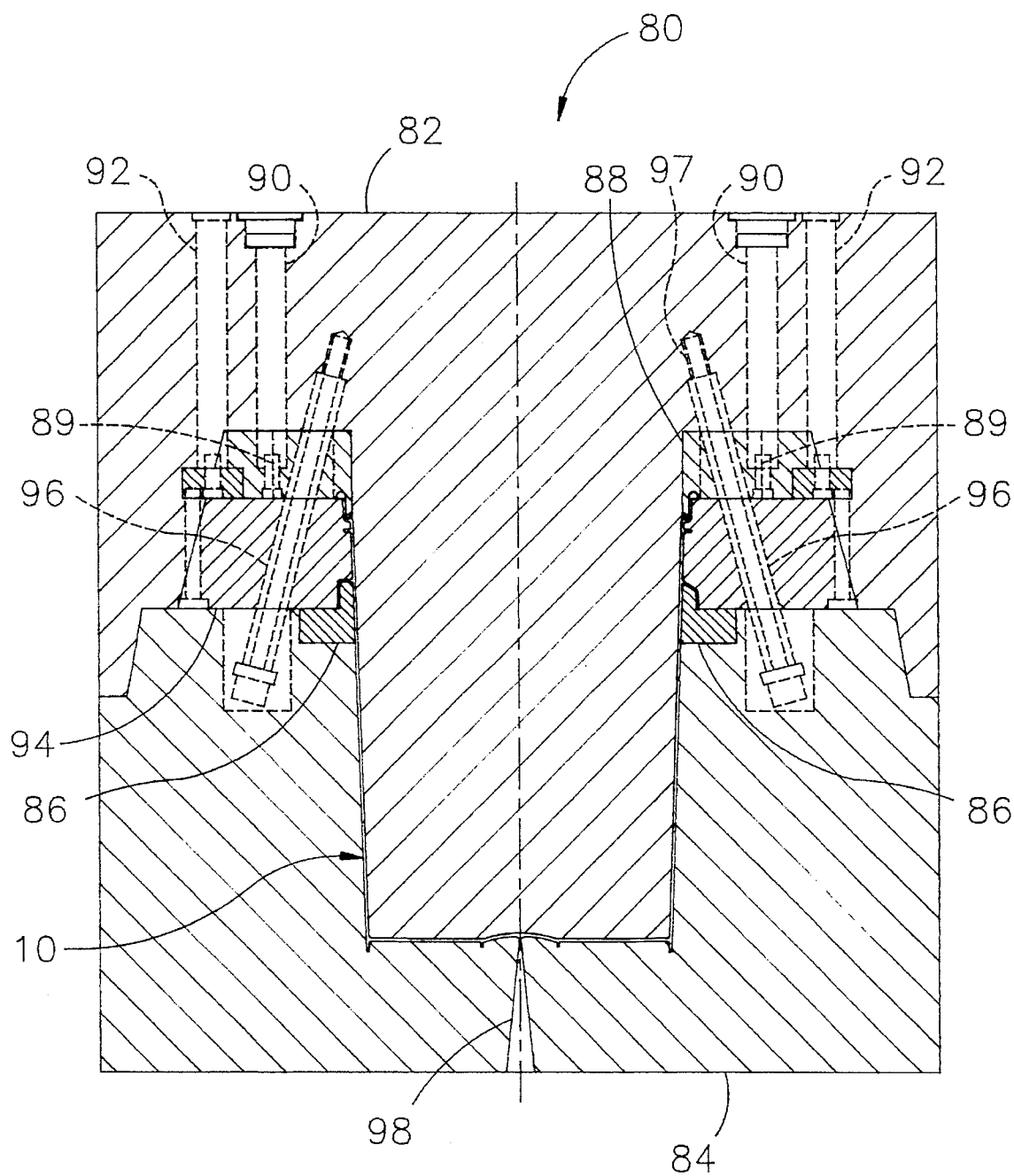
FIG. 5 is a cross-sectional side view of another embodiment according to this invention in its closed configuration.

Another embodiment of the mold assembly according to this invention, generally indicated in FIG. 5 by numeral 80, differs from the embodiment shown in FIG. 3 in that guide rods 96 along which split ring segments 94 travel are mounted within core 82 and not in solid stripper ring 88. Guide rods 96 are mounted within core 82 with threads 97. Mold assembly 80 has a core 82, a cavity 84, an insert 86, a solid stripper ring 88, guide rods 90, ejector rods 92, split ring segments 94, guide rods 96 and a sprue 98.

Figure 6A:
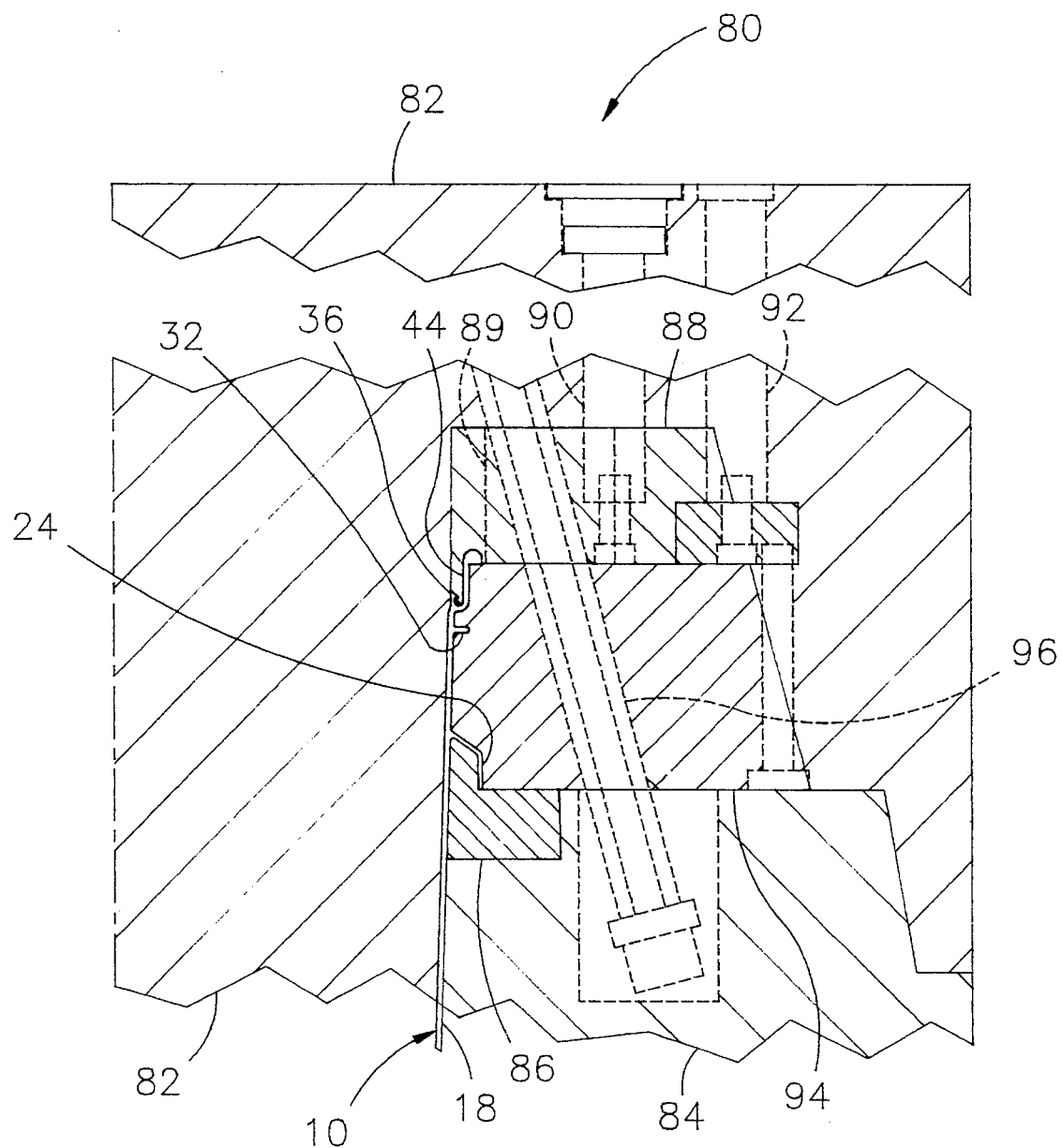
FIGS. 6a–6d are cut-a-way cross-sectional side views of the embodiment shown in FIG. 5, illustrating a progression from the mold's closed configuration (FIG. 6a) to the mold's open configuration (FIG. 6d).

FIG. 6a shows mold assembly 80 in its closed configuration after material has been injected to form pail 10. Core 82 forms inner surfaces 16, 22 and 38 of pail bottom 12, pail wall 18, and inner lock member 36, respectively (FIGS. 1 and 2). Cavity 84 forms outer surfaces 14 and 20 of pail bottom 12 and wall 18, and insert 86 forms recess surface 28 of skirt 24. Solid ring 88 forms outer surface 40 and flange 42 of inner lock member 36 as well as inner surface 46 and flange 50 of outer lock member 44. Split ring segments 94 form outer surface 48 of outer lock member 44, stiffening flange 32, ribs 34, and outer surface 26 of skirt 24.

Figure 6B:
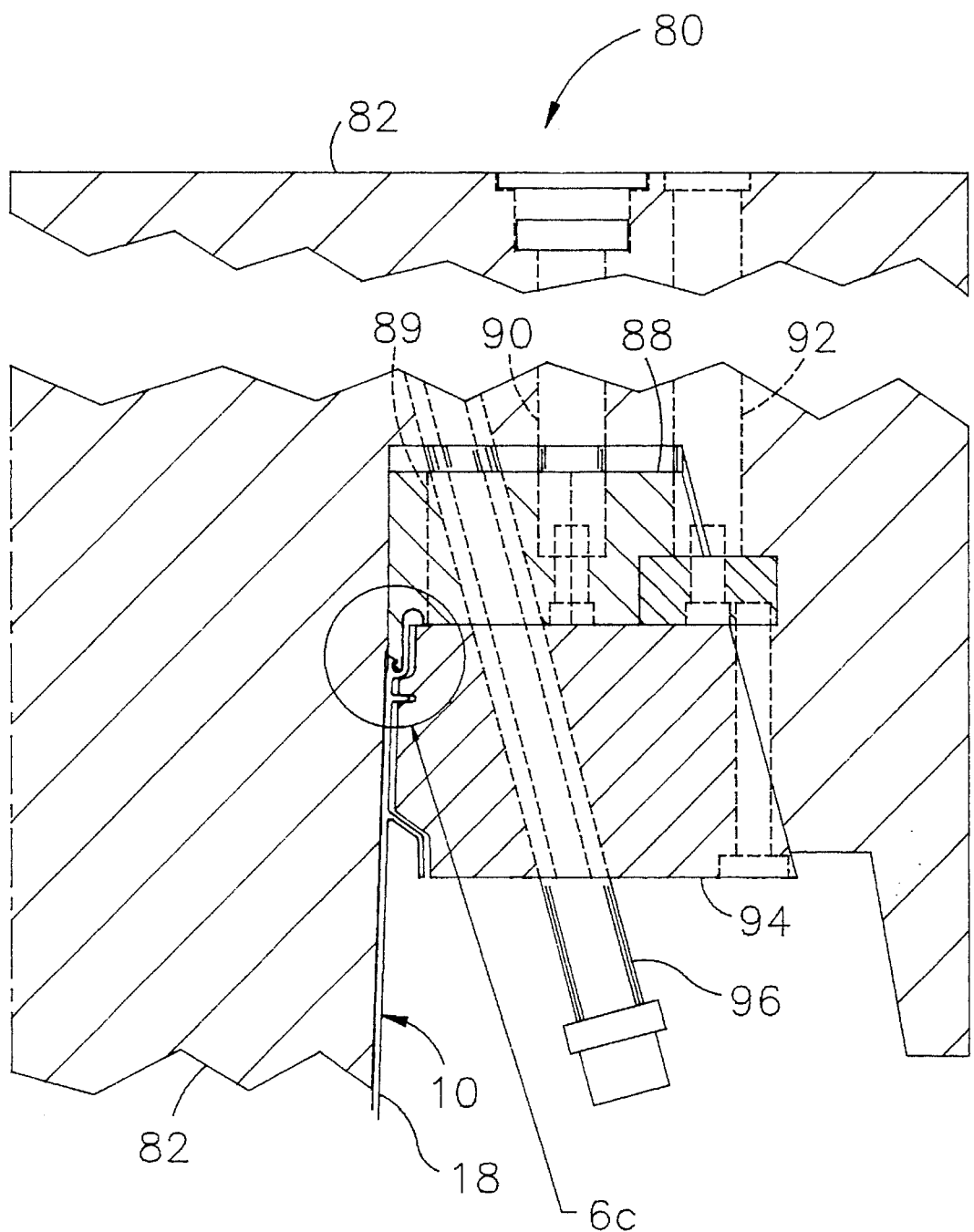

FIG. 6b illustrates mold assembly 80 as it appears after core 82 is removed from engagement with cavity 84 and ejector rods 92 have begun to force ring segments 94 away from core 82. A pusher (not shown) provides downward force sufficient to cause ring 88 to travel in a direction parallel to the core axis along guide rods 90 and follow ring segments 94. Because guide rods 96 are rigidly mounted within core 82, ring segments 94 immediately travel along guide rods 96 at an angle to the core axis causing separation between ring segments 94 and the outside surfaces of pail 10. Ring 88 does not, however, travel along guide rods and instead travels parallel to the core axis. Accordingly, ring 88 is provided with slots 89 to accommodate each guide rod 96.

Figure 6C:
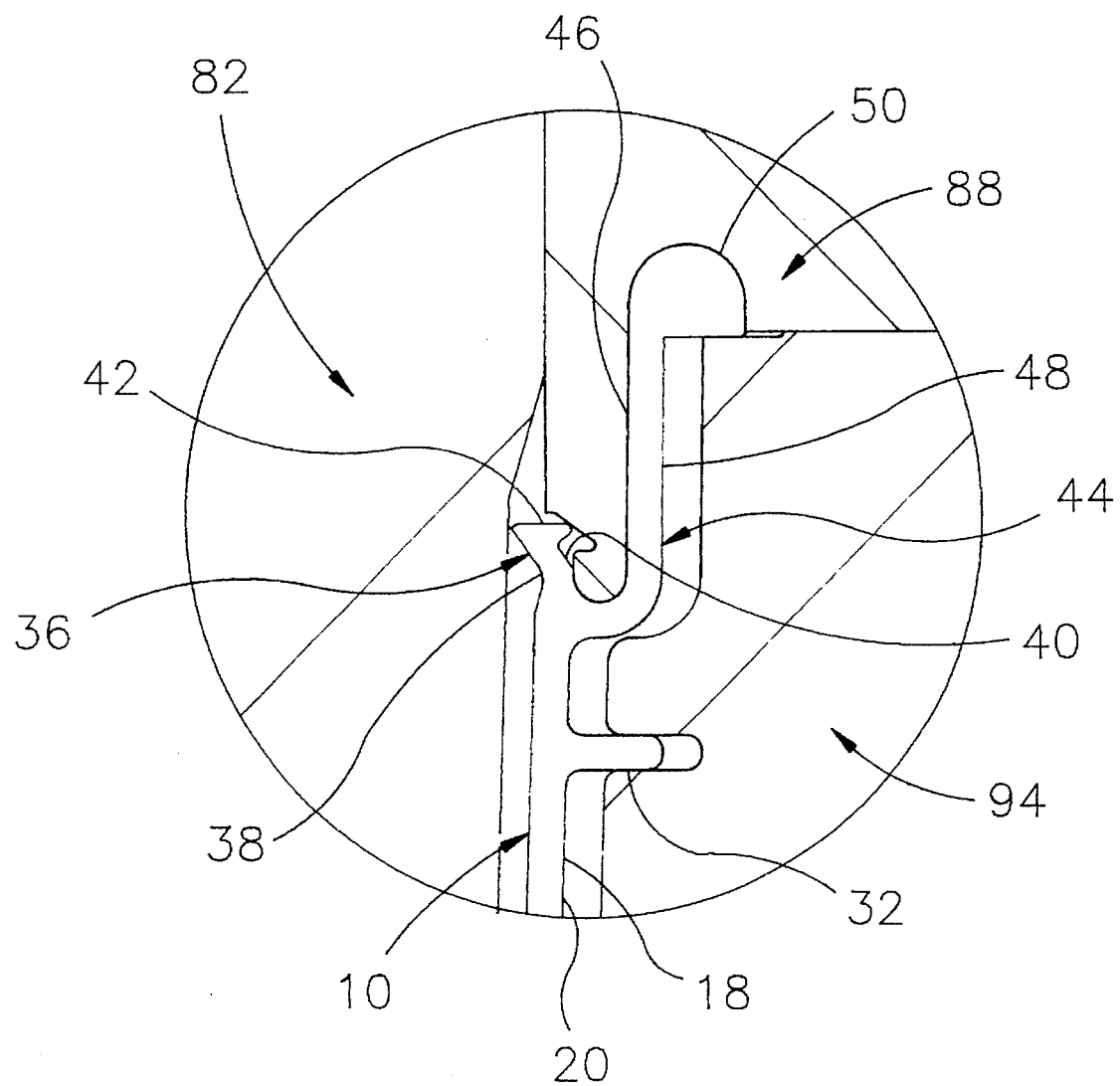

Referring to FIG. 6c, ring 88 and ring segments 94 remain in contact as ring segments 94 separate from outer surface 48 of outer lock member 44, stiffening flange 32, ribs 34 (not shown) and outer surface 20 of pail wall 18. As pail 10 is pushed away from core 82, the gap between the inner wall of the pail and the surface of core 82 permits the inward deflection of inner lock member 36 so that the lock member's flange 42 can be released from the contour of ring 88.

Figure 6D:
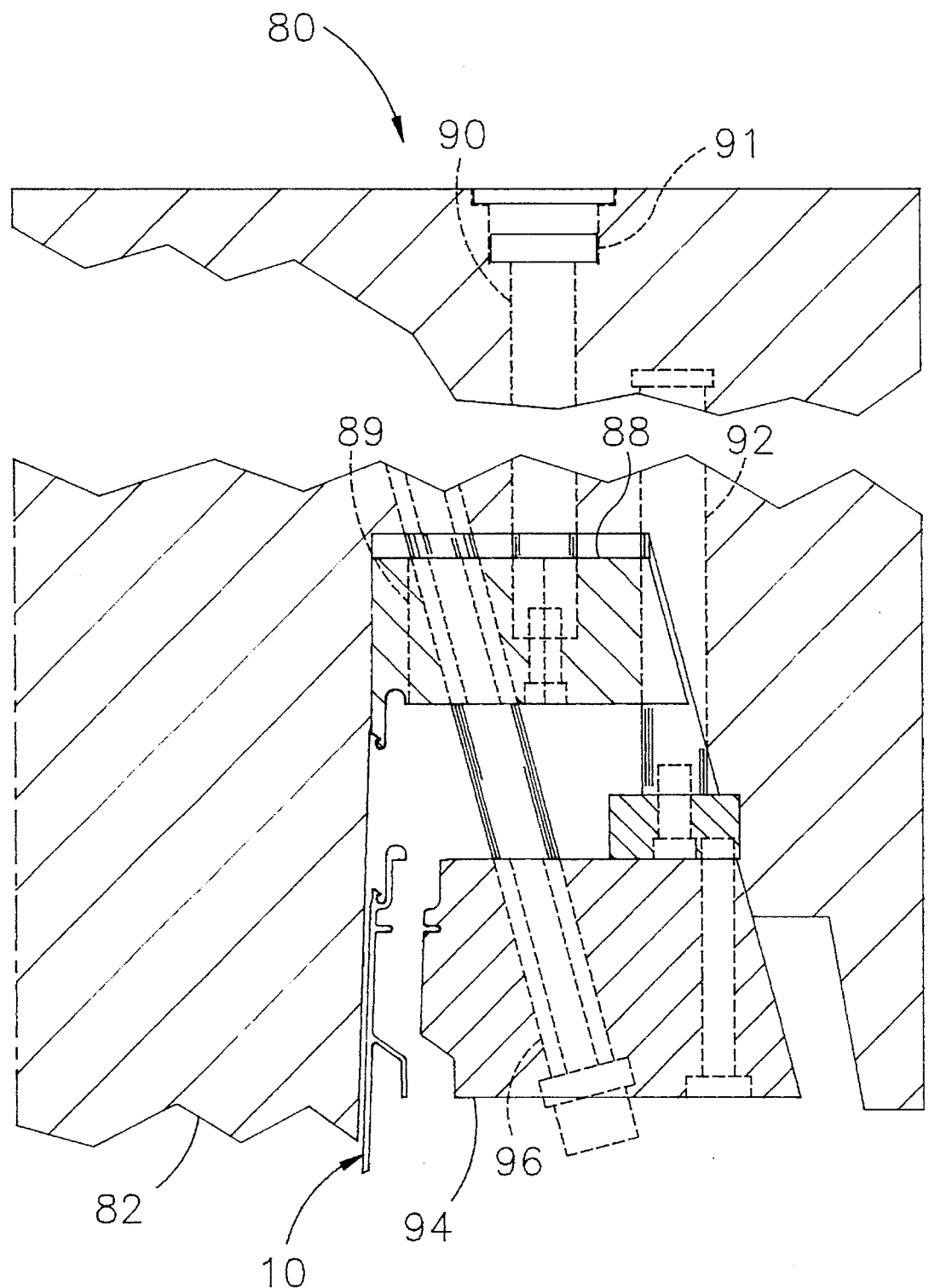

As illustrated in FIG. 6d, ring 88 remains stationary at the end of its travel due to stops 91 in guide rods 90. Split ring segments 94, however, continue to move along guide rods 96 by means of force exerted by ejector rods 92. When ring segments 94 reach the end of their travel along guide rods 96, pail 10 is entirely free from mold components 82, 88 and 94 and can be removed from the mold. The angle at which guide rods 96 are mounted in core 82, and the distance segments 94 travel along the rods, are determined in the same manner as the angle of guide rods 76 in mold assembly 60.

To prepare to mold the next pail, ejector rods 92 return ring segments 94 along guide rods 96 until they contact ring 88. The ring segments 94 then force ring 88 along guide rods 90 until it rejoins core 82 or ring 88 is moved toward core 82 separately along guide rods 90 by a pneumatic or hydraulic cylinder (not shown). After core 82 recontacts cavity 84, mold assembly 80 is in its fully closed configuration and is prepared for the injection of material to form the next pail.

The rigid mounting of guide rods 96 within core 82 provides this embodiment of the mold assembly with additional structural rigidity. However, because ring segments 94 always travel along guide rods 96 at an angle to the core axis, before ring 88 reaches the end of its travel, there is some limited sliding contact between ring segments 94 and ring 88.

In any embodiment of the mold assembly according to this invention, several important benefits are conferred. A mold assembly according to this invention is capable of forming pails having pronounced and detailed protrusions on their walls, thereby facilitating the manufacture of pails having superior locking mechanisms to which covers can be securely or permanently attached. A mold assembly according to this invention provides a stripper ring having the dual function of stripping the molded pail from the core and forming important details in the pail's locking mechanism. A mold assembly according to this invention also provides split ring segments which form important details of the locking mechanism and facilitate the release of the molded pail. A mold assembly according to this invention provides these and other features without utilizing complicated assemblies or incurring undue mold wear.

Because the ejector rods push against the split ring segments (rather than against the solid stripper ring which merely follows the ring segments) to open the mold assembly, there is a reduction in the force and associated wear between the rings as the mold is opened. Also, because the ring segments do not rely on the solid ring for forward advancement, this configuration permits the separation of the rings after a predetermined distance of the stripper ring's travel, thereby reducing mold wear caused by relative sliding contact between the rings. In fact, when ring segment guide rods are mounted within the stripper ring rather than in the core, wear caused by sliding contact between the rings is almost eliminated.

If desired, many changes and modifications can be made without departing from the spirit and scope of this invention. The various components of the mold assembly can be configured to create pails having protrusions with a variety of shapes. In fact, the mold assembly can be configured to create any number of products which could have larger, smaller or even no protrusions. As indicated previously, the split ring guide rods can optionally be mounted in the core to provide additional stability to the mold assembly or within the solid stripper ring to minimize or eliminate wear caused by sliding contact between the solid stripper ring and the split ring segments.

Although this invention has been described with reference to specific forms selected for illustration in the drawings, and with reference to many variations thereof, it will be appreciated that many other variations may be made without departing from the important feature of providing an inexpensive and reliable mold assembly and method for forming articles having radially extending protrusions. All variations to the embodiments explicitly described herein, including the substitution of equivalent elements for those specifically shown and described, are within the spirit and scope of the invention as defined in the appended claims.

What is claimed is:

1. A mold for forming an article having at least one outwardly extending protrusion, said mold having open and closed positions and comprising:

a mold core movable along an axis;

substantially parallel guide rods having axes substantially parallel to said core axis;

a stripper ring movable a limited distance of travel along said guide rods, said stripper ring being substantially adjacent said core when the mold is in said closed position;

a set of angularly arranged guide rods having axes at an angle to said core axis;

a split ring having segments movable adjacent said stripper ring said limited distance of travel of said stripper ring and movable an additional distance along said angularly arranged guide rods to a position separated from said stripper ring in a direction along said core axis; and a mold member spaced from said mold core to form a mold cavity, said cavity being adjacent said core and split ring when the mold is in said closed position, said article being removable from the mold in said open position with said mold core moved along said core axis away from said mold cavity, said stripper ring moved said limited distance of travel along said guide rods, and said split ring segments moved said additional distance along said angularly arranged guide rods.

2. The mold of claim 1, wherein said split ring has three or more segments.

3. The mold of claim 2, wherein said split ring segments are approximately equal in size.

4. The mold of claim 1, wherein an end portion of each said angularly arranged guide rod is mounted in said mold core such that said angularly arranged guide rods are stationary relative to said mold core.

5. A mold for forming an article having at least one outwardly extending protrusion, said mold having open and closed positions and comprising:

a mold core movable along an axis;

substantially parallel guide rods having axes substantially parallel to said core axis;

a stripper ring movable a limited distance of travel along said guide rods, said stripper ring being substantially adjacent said core when the mold is in said closed position;

a set of angularly arranged guide rods having axes at an angle to said core axis, an end portion of each said angularly arranged guide rod being mounted in said stripper ring such that said angularly arranged guide rods are stationary relative to said stripper ring;

a split ring having segments movable adjacent said stripper ring said limited distance of travel of said stripper ring and movable an additional distance relative to said stripper ring along said angularly arranged guide rods; and a mold member spaced from said mold core to form a mold cavity, said cavity being adjacent said core and split ring when the mold is in said closed position, said article being removable from the mold in said open position with said mold core moved along said core axis away from said mold cavity, said stripper ring moved said limited distance of travel along said guide rods, and said split ring segments moved said additional distance along said angularly arranged guide rods.

6. The mold of claim 1, wherein:

said article is a pail having a bottom with inner and outer surfaces, a wall with inner and outer surfaces extending from said bottom, a skirt with outer and recessed surfaces extending from the outer surface of said wall, a stiffening flange extending from the outer surface of said wall above said skirt, and a locking mechanism extending from said wall above said stiffening flange, said locking mechanism having inner and outer lock members both terminating in outwardly extending flanges and having inner and outer surfaces, said locking mechanism also having ribs extending between said stiffening flange and said outer lock member;

said mold core is shaped to form the inner surfaces of said pail wall, inner lock member, and pail bottom;

said stripper ring is shaped to form the inner surface and flange of said outer lock member and the outer surface and flange of said inner lock member;

said split ring segments is shaped to form said stiffening flange, ribs, and outer surfaces of said outer lock member and skirt; and said mold cavity is shaped to form the recess in said skirt and the outer surfaces of said pail bottom and wall.

7. A mold for forming an article having an inside surface and an outside surface with at least one protrusion extending outwardly from said outside surface, said mold having open and closed positions and comprising:

means forming the inside surface of said article, said inside surface forming means being movable along a molding axis;

means forming a portion of the outside surface of said article, said portion forming means being movable a limited distance of travel along said molding axis;

means forming an adjacent portion of the outside surface of said article, said adjacent portion forming means being movable with said portion forming means for said limited distance of travel and then an additional distance along axes at an angle to said molding axis to a position separated from said stripper ring in a direction along said molding axis;

ejection means contacting said adjacent portion forming means, said ejection means being positioned to move said adjacent portion forming means said limited distance and said additional distance; and means forming a remaining portion of the outside surface of said article, said article being removable from the mold in said open position with said inside surface forming means moved along said molding axis away from said remaining portion forming means, said portion forming means moved said limited distance of travel along said molding axis, and said adjacent portion forming means moved by said ejection means said additional distance along axes at an angle to said molding axis.

8. The mold claimed in claim 7, wherein said adjacent portion forming means is a split ring having four segments.

* * * * *